US005520780A

United States Patent [19]
Walker

[11] Patent Number: 5,520,780
[45] Date of Patent: May 28, 1996

[54] METHOD AND APPARATUS FOR DE-INKING NEWSPRINT USING COUNTERFLOW EXTRACTOR

[75] Inventor: David R. Walker, Clearwater, Fla.

[73] Assignee: dxResources Corporation, Tampa, Fla.

[21] Appl. No.: 159,689

[22] Filed: Nov. 30, 1993

[51] Int. Cl.⁶ .................................................. D21B 1/08
[52] U.S. Cl. ................................................ 162/4; 100/37
[58] Field of Search ........................ 162/4, 60, 5, 56, 162/189, 190, 28, 30.1, 30.11, 18, 26, 28; 100/37, 117, 112, 145; 210/2, 414, 415, 772; 209/657, 676

[56] References Cited

U.S. PATENT DOCUMENTS

| | | |
|---|---|---|
| 962,597 | 6/1910 | Stewart . |
| 1,933,609 | 11/1933 | Wagner ................................. 162/60 |
| 2,617,273 | 11/1952 | Findlay . |
| 3,004,876 | 10/1961 | Zies ........................................ 162/56 |
| 3,106,323 | 1/1962 | Altmann et al. ........................ 162/4 |
| 3,253,892 | 5/1966 | Brignac et al. . |
| 3,293,118 | 12/1966 | Putman et al. ....................... 162/236 |
| 3,446,696 | 5/1969 | Illingworth ............................. 162/5 |
| 3,471,328 | 10/1969 | Bruniche-Olsen . |
| 3,507,742 | 4/1970 | Rice . |
| 3,573,982 | 4/1971 | Silver . |
| 3,644,103 | 2/1972 | Yoon et al. . |
| 3,804,670 | 4/1974 | Farmer . |
| 3,846,227 | 11/1974 | Mestetsky et al. ................... 162/5 |
| 4,088,528 | 5/1978 | Berger et al. ......................... 162/56 |
| 4,331,534 | 5/1982 | Barnscheidt . |
| 4,363,264 | 12/1982 | Lang et al. . |
| 4,465,591 | 8/1984 | Holz et al. . |
| 4,680,088 | 7/1987 | Bastanziere ........................... 162/4 |
| 4,780,179 | 10/1988 | Clement . |
| 4,838,995 | 6/1989 | Klausen ................................. 162/56 |
| 4,902,518 | 2/1990 | Lang et al. . |
| 4,909,900 | 3/1990 | Matzke et al. ....................... 162/56 |
| 4,997,578 | 3/1991 | Berggren .............................. 162/56 |
| 5,131,414 | 7/1992 | Fagg et al. . |
| 5,176,793 | 1/1993 | Kurtz ................................... 162/56 |
| 5,314,580 | 5/1994 | Di Tullio ............................ 162/189 |

OTHER PUBLICATIONS

Horoak et al, "Principles of De-ink Washing", Tappi vol. 63 No. 11 (Nov. 1980) pp. 135–138.
Seifert, Peter, "Understanding Washing of Secondary Fiber", Tappi Pulping Conference, No. 1. 1–5, 1992.
Tim Lange, *The Role of Research and Development in Food Liquid* Harvest Horticultual Holdings Limited, May 1988.

Primary Examiner—Brenda A. Lamb
Attorney, Agent, or Firm—Nilles & Nilles

[57] ABSTRACT

A newspaper de-inking system and process require much less water than conventional de-inking systems and which require much lower capital expenditure. The system removes ink from newspaper pulp in a continuous process using one or more extractors each of which performs a de-inking operation equivalent to 6 or more stages of a conventional de-inking process using reactor tanks. Water and heat are conserved still further by employing an evaporator to separate pure water from the extractor effluent and by recycling the purified water to the extractor and to other components of the system. A particularly preferred extractor employs a counterflow single-screw conveyor the flights of which have slots formed therethrough which extend counter to the direction of screw rotation. The slots permit efficient extraction using relatively little de-inking solution and at the same time obviate the need to periodically reverse the direction of screw rotation to unclog the slots. The flow of de-inking solution through the pulp and flights is determined by the dimension, number, and orientation of the slots, and by the pitch of the screw conveyor.

19 Claims, 10 Drawing Sheets

METHOD AND APPARATUS FOR DE-INKING NEWSPRINT USING COUNTERFLOW EXTRACTOR

BACKGROUND OF THE INVENTION

1. Field of the Invention

The invention relates to de-inking systems and, more particularly, relates to a system and process for removing soluble ink from newsprint or the like using a counterflow extractor.

2. Discussion of the Related Art

Systems for extracting soluble ink from newsprint or the like are well known. Such systems typically employ at least a six-stage batch de-inking process in which individual batches of newsprint pulp are each repeatedly slurried and de-watered through compression until, at the end of the process, substantially all of the ink has been removed from the fibrous paper product. Specifically, the newsprint, after being soaked in a tank and turned into a pulp, is soaked in a relatively large reactor tank, pumped out, and compressed, thereby removing some of the ink. The partially de-inked pulp is then soaked in another tank, pumped out, and recompressed, thereby removing more ink. This process is typically repeated at least 6 times and, depending upon the degree of de-inking required and the quality of the fibers being treated, may require 12 or more de-inking stages before de-inking is complete.

The conventional de-inking system and process exhibits several drawbacks and disadvantages. For instance, the system is relatively complex and requires at least 6 reactor tanks for removing the ink and associated presses and filters for de-watering. Such a complex system requires considerable space and capital expenditure rendering newspaper de-inking uneconomical for many businesses and municipalities.

In addition, the traditional de-inking process employing at least 6—and typically 12 or more—reactor tanks expends large quantities of water which is polluted in the de-inking process and which must be treated for re-use, thus further increasing process cost. Even if the pollution problem could be dealt with adequately, many businesses and municipalities in arid climates cannot afford the water required for de-inking—assuming of course that sufficient water is available. The need has therefore arisen to remove economically ink from newsprint or the like using as little water as possible.

OBJECTS AND SUMMARY OF THE INVENTION

It is therefore an object of the invention to provide a process of economically and efficiently extracting ink from newsprint or the like.

Another object of the invention is to reduce the amount of equipment required for newsprint de-inking.

Still another object of the invention is to provide a newsprint de-inking process which conserves water, thereby reducing operating costs.

In accordance with a first aspect of the invention, these and other objects are achieved by providing a method of de-inking newsprint pulp including feeding the newsprint pulp into an extractor including a housing having first and second end portions, a pulp inlet and an effluent outlet being provided in the first end portion and a de-inking solution inlet and a pulp outlet being provided in the second end portion. Also included are the steps of feeding a de-inking solution into the de-inking solution inlet, and conveying the pulp through the housing from the first end portion to the second end portion while the de-inking solution flows through the housing from the second end portion towards the first end portion, thereby removing ink from the pulp and forming an effluent. A final step involves discharging the pulp from the pulp outlet and discharging the effluent from the effluent outlet.

Preferably, the conveying step includes conveying the pulp through a conveyor housing by rotating a shaft while the de-inking solution flows through the pulp and through passages in flights of the conveyor, thereby extracting the ink from the pulp and forming the effluent. The passages preferably comprise elongated slots extending in a direction counter to the direction of shaft rotation and thus not subject to clogging. Because the slots do not clog, screw reversal is not required. At worst, screw rotation may be periodically stopped so as to permit pulp which is accumulated on one side of the housing to fall by gravity to the other side of the housing.

Water and heat are preferably conserved by feeding the effluent to an evaporator and separating at least a portion of water from the effluent to create an ink concentrate, and then feeding some of the portion of the water to the de-inking solution inlet of the housing.

In some instances, treating the pulp in a single reactor may not provide complete de-inking, in which case the process contains the additional steps of feeding the pulp from the pulp outlet of the housing of the first extractor to a pulp inlet formed in a first end portion of a housing of a second extractor. The housing of the second extractor further includes a second end portion, an effluent outlet provided in the first end portion, and a de-inking solution inlet and a pulp outlet provided in the second end portion. Other steps include feeding a second de-inking solution into the de-inking solution inlet of the housing of the second extractor and conveying the pulp through the housing of the second extractor from the first end portion to the second end portion while the de-inking solution flows through the housing from the second end portion towards the first end portion, thereby removing ink from the pulp and forming a second effluent.

Yet another object of the invention is to provide an efficient and relatively inexpensive newsprint de-inking system.

In accordance with another aspect of the invention, this object is met by providing a system for removing ink from newsprint pulp comprising a source of newsprint pulp and an extractor for de-inking the pulp. The extractor includes a housing having located therein a pulp inlet communicating with the newsprint pulp source, a de-inking solution inlet, an effluent outlet, and a pulp outlet. A screw conveyor is rotatably mounted in the housing and includes a rotatable shaft, and a plurality of flights mounted generally transversely on the shaft, each of the flights having passages formed therethrough for the passage of liquids. The passages preferably comprise elongated slots extending in a direction counter to the direction of shaft rotation.

Depending upon the amount of de-inking or color removal required, a second extractor may be provided which includes a housing having located therein a pulp inlet communicating with the pulp outlet of the first extractor, a de-inking solution inlet, a pulp outlet, and an effluent outlet. A screw conveyor is rotatably mounted in the housing of the second extractor and includes a rotatable shaft, and a plurality of flights mounted generally transversely on the shaft, each of the flights having passages formed therethrough for the passage of liquids.

To conserve water through recycling, an evaporator is preferably provided which includes an inlet connected to the effluent outlet of the housing, a pure water outlet connected to the de-inking solution outlet of the housing, and a concentrate outlet.

Other objects, features, and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications within the scope of the present invention may be made without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENT

1. Resume

Pursuant to the invention, a newspaper de-inking system and process are disclosed which require much less water than conventional de-inking systems and which require much lower capital expenditure. The system removes ink from newspaper pulp in a continuous process using one or more extractors each of which performs a de-inking operation equivalent to 6 or more stages of a conventional de-inking process using reactor tanks. Water and heat are conserved still further by employing an evaporator to separate pure water from the extractor effluent and by recycling the purified water to the extractor and to other components of the system. A particularly preferred extractor employs a counterflow single-screw conveyor the flights of which have slots formed therethrough which extend counter to the direction of screw rotation. The slots permit efficient extraction using relatively little de-inking solution and at the same time obviate the need to periodically reverse the direction of screw rotation to unclog the slots. The flow of de-inking solution through the pulp and flights is determined by the dimension, number, and orientation of the slots, and by the pitch of the screw conveyor.

2. System Overview

Figure 1:
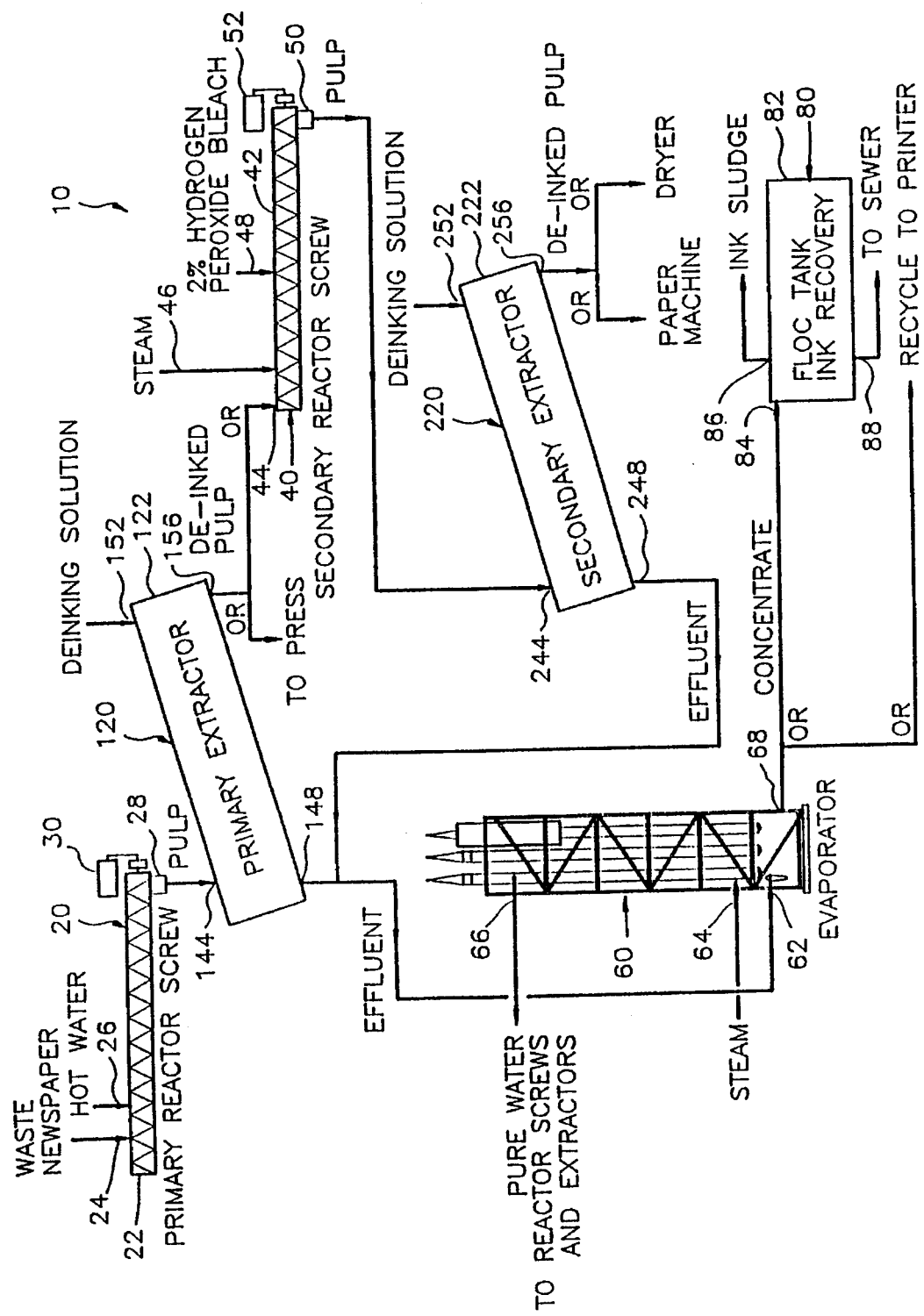
FIG. 1 schematically represents a newsprint de-inking system constructed in accordance with a preferred embodiment of the invention.

Referring now to FIG. 1, a newspaper de-inking system 10 is illustrated employing one or more counterflow single-screw extractors to separate the ink from the paper pulp. The system includes a primary reactor 20, a primary extractor 120 for primary de-inking, a secondary reactor 40, and a secondary extractor 220 for secondary de-inking and/or bleach removal. Provided for the treatment of extractor effluent is an evaporator 60 and an ink recovery device 80.

a. Construction

Primary reactor 20 could be any device adapted to act as a source of pulp for extractor 120, and is preferably adapted to pulverize newsprint and to mix it with warm water and an alkaline bath so that the paper cells expand to form a pulp particularly suitable for de-inking. A particularly preferred reactor 20 comprises a conventional screw conveyor 22 having respective inlets 24 and 26 for hydrated waste newspaper and warm water and having an outlet 28 for the pulp. The screw of conveyor 20 is driven by a suitable motor 30 in a manner which is well known.

Primary extractor 120 is designed to provide primary de-inking and, if used in some applications in which the paper fiber quality and/or the ink quality renders the ink relatively easy to remove, and/or if the color of the recycled paper is of little concern, may be the only extractor employed. The extractor 120 includes an inclined housing 122 having lower and upper end portions with an upper pulp inlet 144 and a lower effluent outlet 148 provided in the lower end portion and with an upper de-inking solution inlet 152 and a lower pulp outlet 156 provided in the upper portion. An especially preferred embodiment of extractor 120 is described in greater detail in section 3 below.

Secondary reactor 40 need not be used in every instance since, as discussed above, the primary extractor 120 may often provide adequate de-inking. If reactor 40 is not present or not used, the pulp from extractor 120 is conveyed directly to a suitable recycling press. If the reactor 40 is to be used, it should be designed to 1) render the pulp received from the pulp outlet 156 of extractor 120 suitable for further extraction in the secondary extractor 40, and 2) bleach the pulp. To this end, reactor 40 is preferably identical in construction to the primary reactor 20 and comprises a screw conveyor 42 having a pulp inlet 44 connected to the outlet 156 of the primary extractor 120, steam and bleach inlets 46, 48, respectively, and a pulp outlet 50. A conventional electric motor 52 or the like turns the screw at relatively high speeds (about 30 RPM) to pulverize the newspaper pulp as it is conveyed through the reactor to mix the pulp with steam and bleach so as to promote further expansion of the paper cells and bleaching of the paper.

The secondary extractor 220 is designed to dissolve any remaining ink in the paper pulp discharged from the outlet 50 of secondary reactor 40 and/or to wash the bleach solution from the pulp. Secondary extractor 220 is, with the possible exception of slot configuration, identical in construction to the primary extractor 120 and thus includes an inclined housing 222 having at its lower end a pulp inlet 244 and an effluent outlet 248 and at its upper end a de-inking solution inlet 252 and a pulp outlet 256.

Evaporator 60, though not essential to the operation of the system, is preferably utilized to conserve water and to supply heat. Any device capable of separating water from the ink, fines, and other materials in the effluent from the extractors 120 and 220 could be employed. However, a steam operated evaporator of the type illustrated is preferred because it is particularly effective. Evaporator 60 has an effluent inlet 62, a steam inlet 64, a pure heated water outlet 66, and a concentrate outlet 68. As is known to those skilled in the art, the evaporator 60 1) uses the heat from steam to remove by boiling much of the water in the effluent from the extractors 120, 220 and 2) condenses and discharges the thus removed water.

Ink recovery device 80 need not be present if there is a demand in the vicinity of the system for recycled ink, in which case the ink concentrate withdrawn from the evaporator outlet 68 could be recycled. If used in a particular application, ink recovery device 80 could be any device capable of recovering ink from the concentrate discharged from the evaporator. Device 80 preferably comprises a conventional floc tank 82 having a concentrate inlet 84, an ink sludge outlet 86, and a water outlet 88.

b. Operation

System 10 operates to de-ink continuously newsprint or the like on a relatively small scale when compared to traditional batch-type de-inking processes and thus is amenable for use by relatively small municipalities or business concerns. System 10 could be provided to operate on a variety of scales but, in the particularly preferred mode, de-inks newsprint pulp at a rate of 20,000 pounds per hour (pph) (6,000 pph of dry newsprint hydrated with 14,000 pph of water) using only 50,000 pph of water, at least some of which is recycled within the process. A traditional batch process, on the other hand, requires 350,000 pph of water to de-ink the same amount of newsprint pulp. None of this water is recycled. The inventive process therefore requires only about one seventh the water required by the conventional batch process. A preferred example of the inventive process will now be detailed.

Newsprint is soaked in a suitable tank (not shown) so as to loosen the fibers and to facilitate the production of pulp. The newsprint is then fed into the inlet 24 of the primary reactor 20 at a rate of 20,000 pph and mixed at relatively high speeds with warm water supplied via inlet 26, thus expanding the paper cells and forming a pulp suitable for de-inking. The water fed into inlet 26 should be sufficiently warm to promote cell expansion but no so hot as to set the ink. Water temperatures in the range of 110° F. to 120° F. have been found particularly suitable for this purpose.

After treatment in reactor 20, pulp is discharged from the outlet 28 of the primary reactor 20 and fed into the pulp inlet 144 of primary extractor 120 at a rate of 20,000 pph. The pulp is conveyed upwardly through the primary extractor 120 while a conventional de-inking solution, fed into de-inking solution inlet 152 and possible other inlets detailed in section 3. below at a combined rate of 50,000 pph, flows countercurrently through the pulp and the extractor in a manner detailed below, thus separating much of the ink from the pulp and forming an ink laden effluent. The effluent is then discharged from lower effluent outlet 148, and the partially or completely de-inked pulp is discharged from the upper pulp outlet 156.

As discussed above, the pulp removed from outlet 156 of primary extractor 120 may not require further treatment. If more treatment is required, e.g. if paper bleaching is desired and/or if the properties of the paper and/or ink are such that some ink remains in the pulp, the pulp discharged from outlet 156 is conveyed to secondary reactor 40 to facilitate further de-inking. Thus, the pulp is fed into pulp inlet 44 of the screw conveyor 42 at a rate of 20,000 pph and agitated by the screw while steam is added via inlet 46 at a rate of 10,000 pph so as to help loosen the paper fibers. Steam can be used in secondary reactor 40 and not in primary reactor 20 because there is relatively little ink remaining in the pulp after treatment in extractor 120 and thus relatively little danger if ink setting. Finally, if a very white final product is required, a suitable bleach such as a 2% solution of hydrogen peroxide may be fed into the inlet 48 at a rate 50,000 pph and recycled within the reactor 40.

The bleached pulp is discharged from outlet 50 of the secondary reactor 40, is now ready for further de-inking, and is fed to the pulp inlet 244 of secondary extractor 240 at a rate of 20,000 pph. The pulp is conveyed upwardly through the secondary extractor 220 while a second de-inking solution, fed into the de-inking solution inlet 252 at a rate of 50,000 pph, flows countercurrently through the pulp, thus completing the de-inking process and removing the bleach solution. The effluent is then discharged from the effluent outlet 248 of extractor 220, and the de-inked pulp is discharged from the pulp outlet 256 of the secondary extractor and sent either to a paper machine or a dryer, depending upon the final product desired.

The effluent discharged from the primary and secondary extractors 120 and 220 is fed into the effluent inlet 62 of evaporator 60 at a combined rate of 100,000 pph, where much of the water is boiled off from the effluent by indirect contact with steam supplied via inlet 64. The vaporized water condenses and is discharged from the evaporator 60 via pure water discharge outlet 66 at a rate of about 90,000 pph. This water is mixed in branch lines (not shown) with caustic solvents or hydrogen peroxide as may be required and fed into suitable inlets of the primary and secondary reactors 20 and 40 and/or the primary and secondary extractors 120 and 220. The remaining concentrate, discharged from outlet 68 at a rate of 10,000 pph, is heavily laden with ink. This ink concentrate may be recycled or transported to floc tank 82 for further handling.

It should be noted that although only a single evaporator is disclosed for both extractors 120 and 220, it may sometimes be desirable to supply a separate evaporator for extractor 220, particularly if the bleach is not adequately washed from the pulp in extractor 220.

Floc tank 82, if present and used in a particular process, receives concentrate from the evaporator outlet 68 via inlet 84 and removes an ink sludge from the concentrate in a process which is per se well known. The ink sludge and resulting water are discharged via outlets 86 and 88 at rates of 2,000 pph and 8,000 pph, respectively. The water is impure because it contains some fibrous products and other particles which render it unsuitable for extraction, but is pure enough to be fed to a municipal sewage system. The ink sludge is removed for further treatment or disposal operations not part of the present invention.

3. Description of Single-Screw Counterflow Extractor

Many suitable extractors could be employed for each of the extractors 120, 220. However, a counterflow single-screw extractor is preferred because it 1) requires relatively little water to operate and 2) is extremely efficient. In fact, a single-screw slotted scroll extractor of the type detailed below can perform in a single device as much de-inking as 6 stages of a prior art de-inking process. Each screw has a plurality of generally annular flights mounted on the screw and presenting elongated slots 1) the number, dimensions, and orientation of which determine the flow rates of de-inking solutions through the extractors and thus determine the de-inking characteristics, and 2) which are angled away from the direction of screw rotation so as to prevent slot clogging, thereby avoiding the necessity of periodically reversing the screws and increasing system efficiency. One such extractor will now be described for use as extractor 120. It should be understood that the same extractor could be used as extractor 220.

a. Construction

Referring now to FIGS. 2–12, a counterflow single-screw extractor 120 includes an inclined trough-shaped housing 122 mounted on a support frame 124 and receiving a rotary screw conveyor 126. The screw conveyor 126 presents a continuous helical scroll 128 formed from a plurality of flights 130 which are mounted on a shaft 132 and which, when viewed from the end, are generally annular. Screw conveyor 126 is driven by a drive system 134 mounted on the support frame 124. Drive system 134 could be a hydraulic motor, an electric motor, or any other assembly capable of imparting unidirectional rotational motion to the screw conveyor 126. An insulated jacket 136 surrounds the lower portion of the housing 122 for heating or cooling the interior of the housing 122.

Housing 122 could be virtually any structure capable of 1) receiving screw conveyor 126, 2) permitting the conveyance of newsprint pulp from the lower or back end 138 to the upper or front end 140 thereof, and 3) permitting a de-inking solution to flow countercurrently through the product in the housing 122. In the illustrated embodiment, housing 122 is generally U-shaped such that approximately one half of each of the flights 130 is disposed adjacent an inner wall 142 of the housing. Disposed at the back end 138 of housing 122 are an upper pulp inlet 144 (fed by a conveyor 146) and a lower effluent outlet 148 emptying into a drain pipe 350. Disposed in the front end 140 of the housing 122 are an upper fresh de-inking solution inlet 152 fed by a pipe 154, and a lower pulp outlet 156 emptying into a take-out conveyor 158. Housing 122 could be open but is preferably capped by a lid 160 having plexiglas view ports 162 located therein for permitting the operation of the extractor 120 to be observed.

Figure 2:
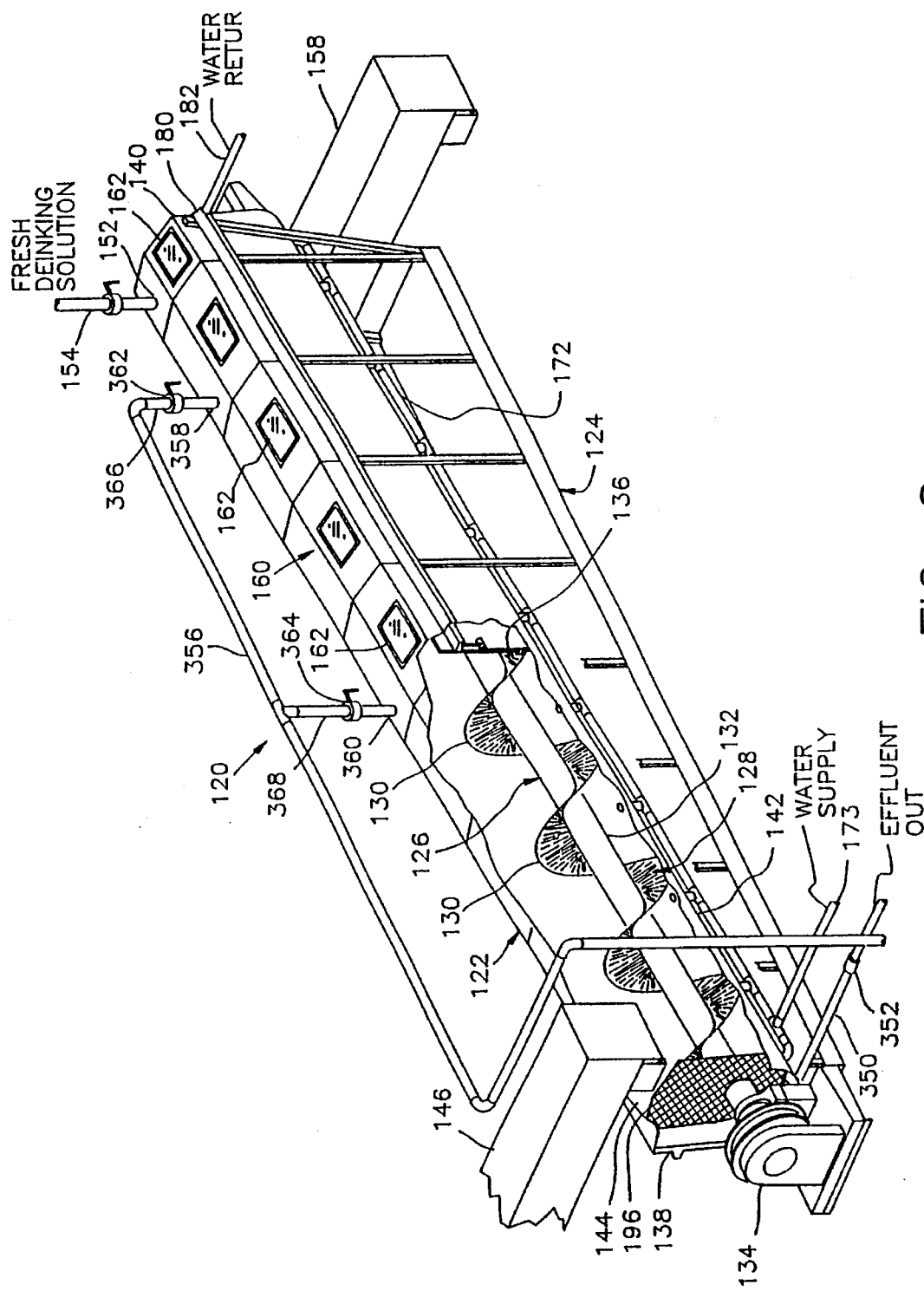
FIG. 2 is a partially cut-away perspective view of a counterflow extractor usable in the system of FIG. 1.
Figure 3:
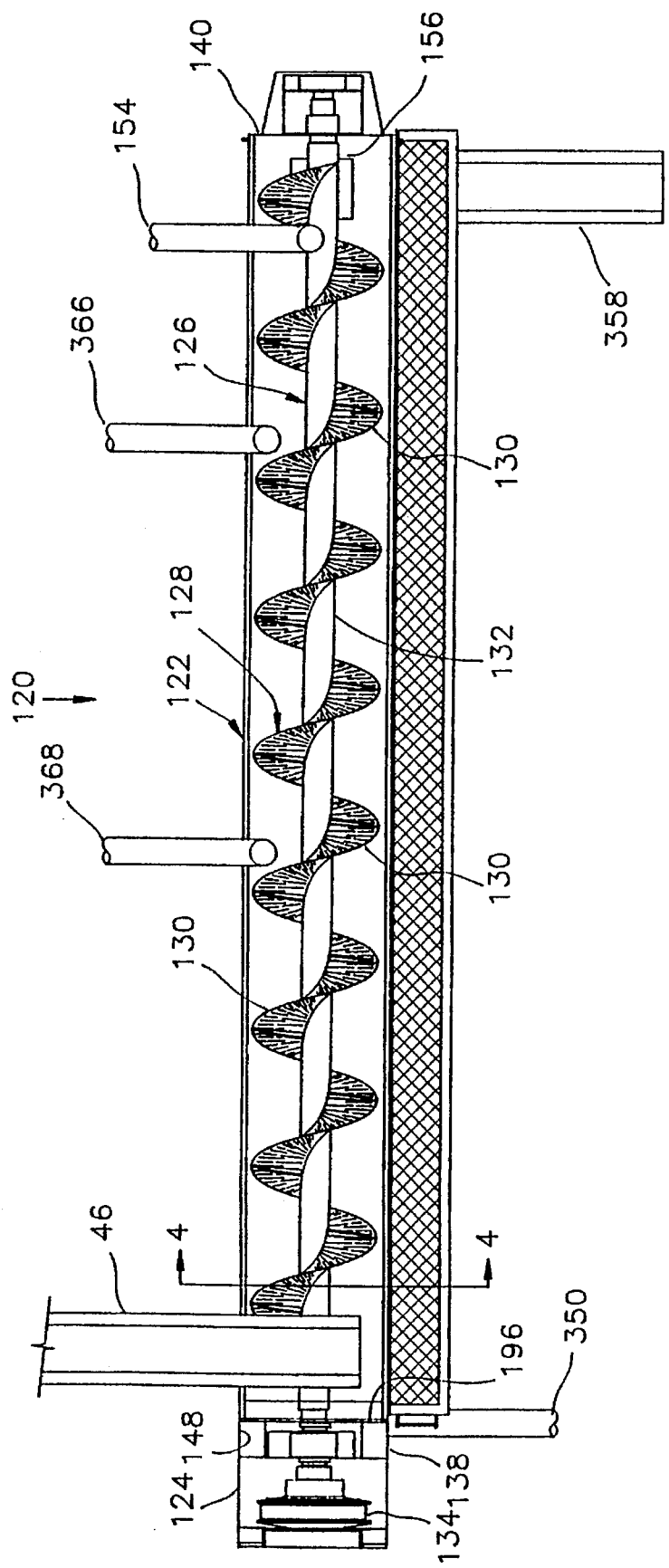
FIG. 3 is a sectional top plan view of the extractor of FIG. 2, with the water jacket and associated elements removed for the sake of illustration.
Figure 5:
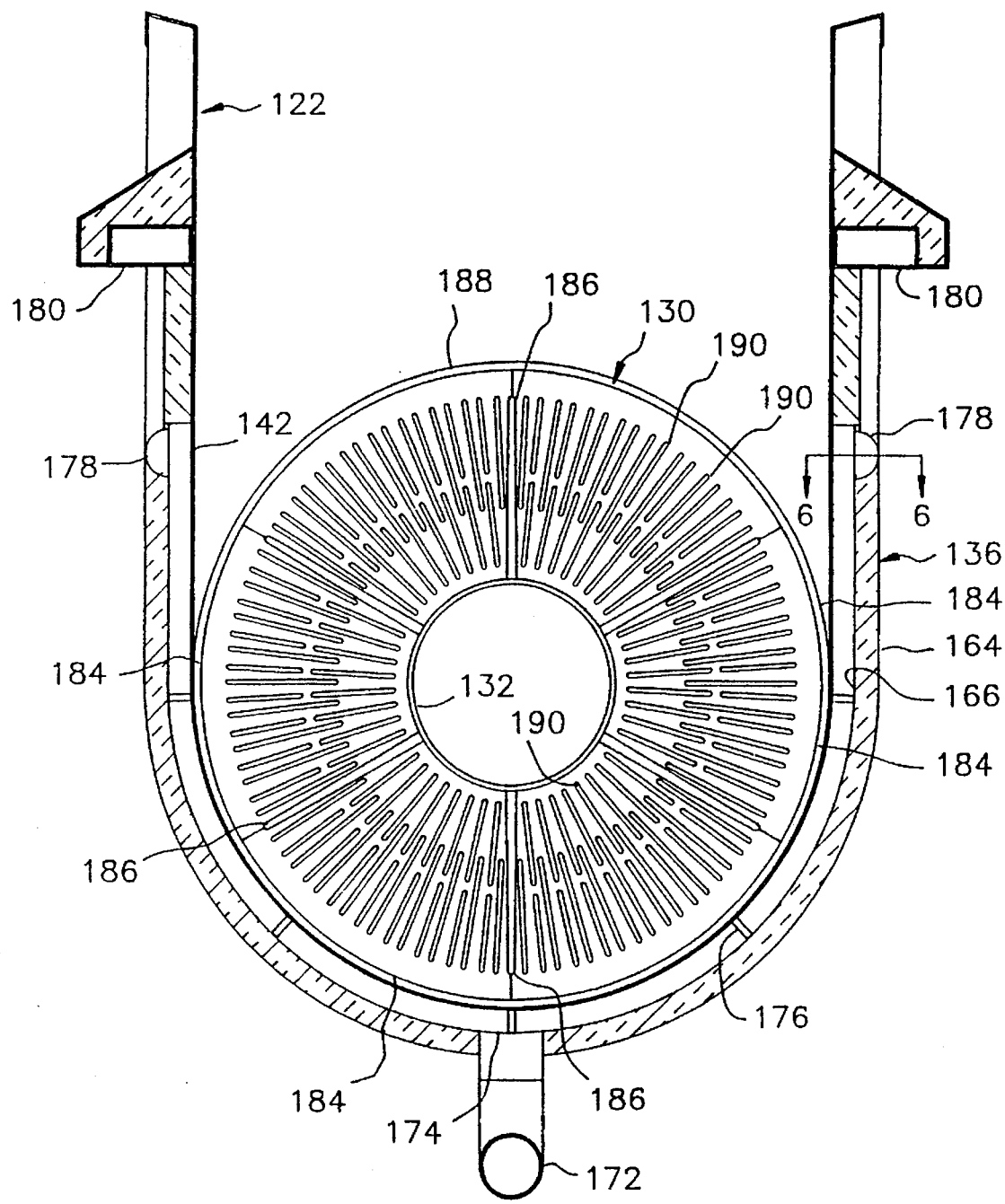
FIG. 5 is a sectional end view taken along the lines 5—5 in FIG. 3.
Figure 6:
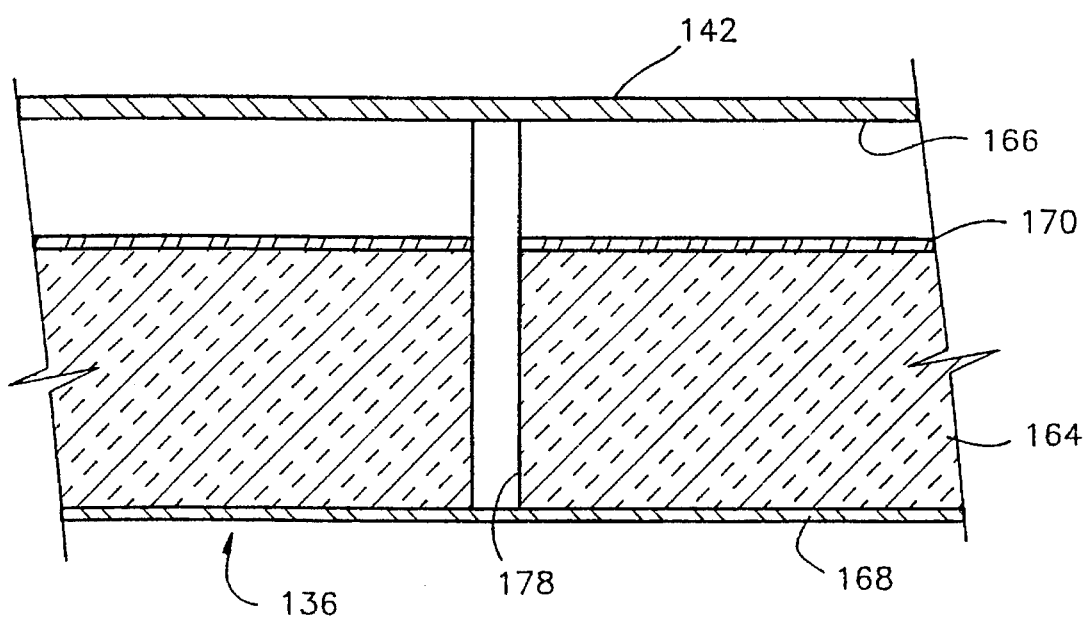
FIG. 6 is a sectional view taken along the lines 6—6 in FIG. 5.

Referring particularly to FIGS. 2, 5, and 6, jacket 136 is designed to heat or cool indirectly the interior of the housing 122 by permitting the continuous flow of a heating medium along the outer surface of the inner wall 142 of the housing 122. The jacket 136 could accommodate steam, water, or any heat transfer medium, and could also operate under pressure or even under a vacuum. The jacket 136 will typically contain hot water and, for the sake of convenience, will henceforth be referred to as a "water jacket" with water being referred to as the heating medium.

Water jacket 136 is formed from a generally U-shaped insulated sleeve 164 spaced from the wall 142 of housing 122 so as to form a chamber 166 therebetween. Insulated sleeve 164 is flanked by sheet metal support plates 168 and 170 or the like of sufficient rigidity to hold the sleeve 164 in position. A system of pipes 172 feed heated water under pressure into the chamber 166 from a feed pipe 173 through a plurality of inlet ports 174 (FIG. 5) spaced along the bottom of housing 122. Baffles 176 protrude into the chamber 166 to promote the circuitous flow of water through the chamber 166 and to prevent the heated water from short circuiting directly to outlets 178. Outlets 178 extend through the upper edge of the insulated sleeve 164 and communicate with a discharge manifold 180 which is connected to an appropriate return pipe 182.

Figure 4:
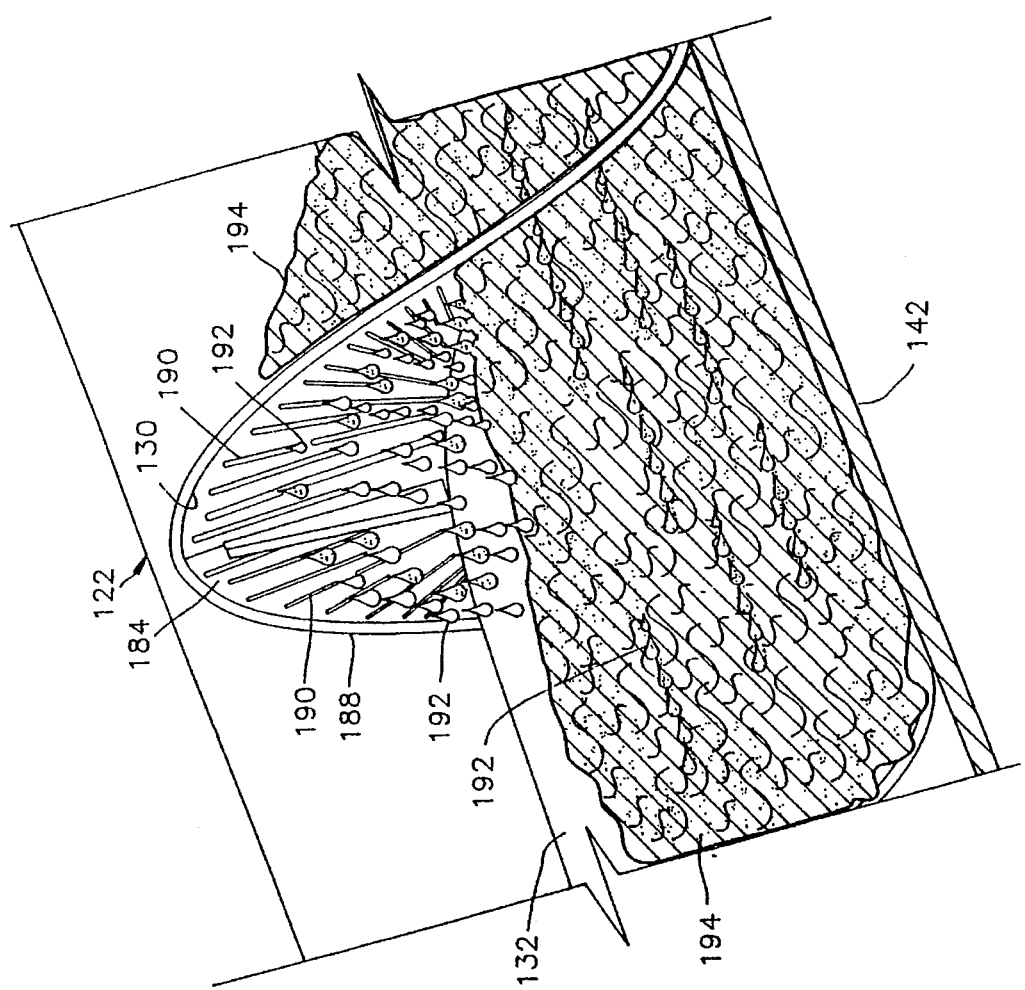
FIG. 4 is an enlarged sectional elevation view illustrating the operation of a portion of the extractor of FIGS. 2 and 3.
Figure 7:
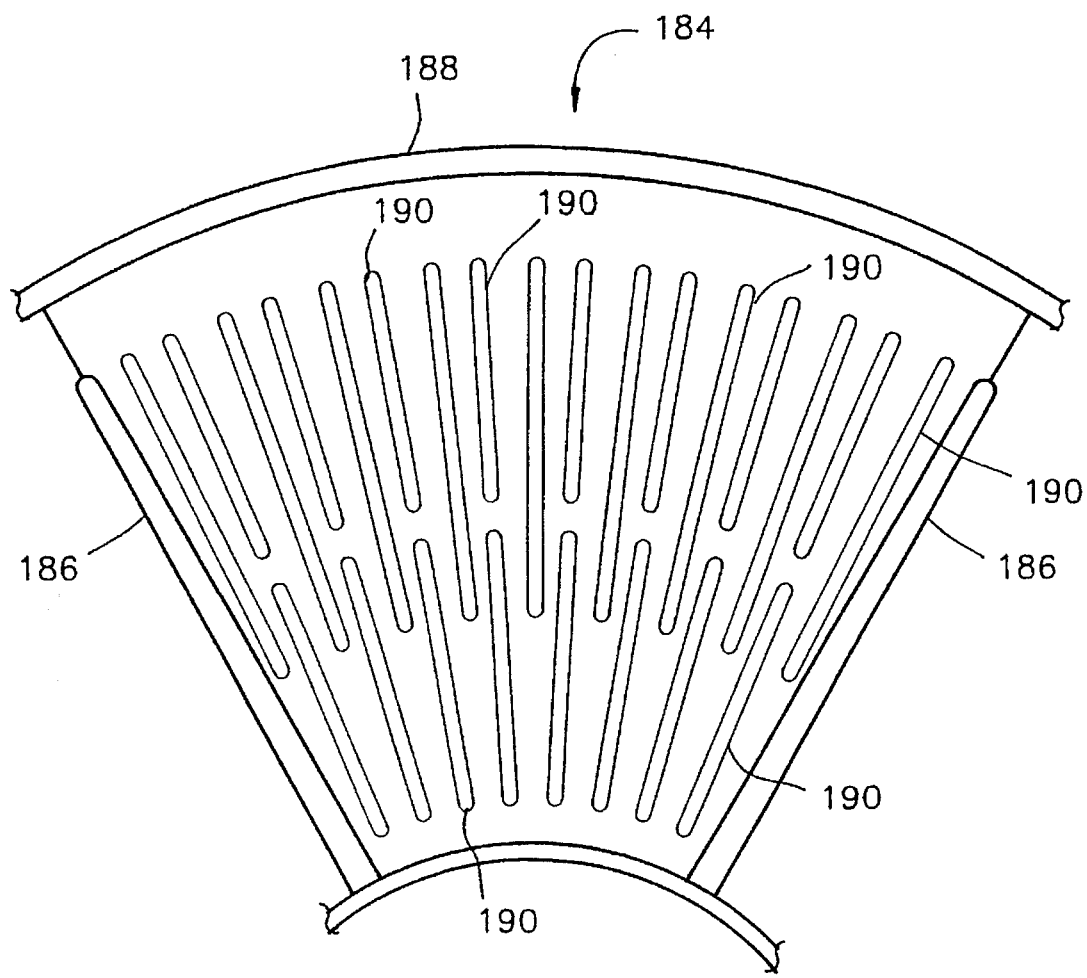
FIG. 7 is a detailed view of a section of a flight of the extractor of FIGS. 2–6 and illustrating a first preferred slot configuration.

Referring now particularly to FIGS. 4, 5, and 7, each of the flights 130 includes a plurality of generally arcuate sections 184 formed from sheet metal or the like and connected at its inner radial end to the shaft 132 and at its arc edges to radial support rods 186 connecting it to adjacent flight sections. Teflon® scrapers 188 are preferably attached to the outer periphery of each of the sections 184 and sealingly slide against the inner surface of the wall 142 of housing 122, thus preventing fluids flowing through the housing 122 from bypassing the slots in the flights (detailed below).

A plurality of elongated slots 190 is formed in each of the flight sections 184 so as to permit the flow of de-inking solution through the flights 130 at a controlled manner determined by the dimension, number, and orientation of slots 190. The flow rate of de-inking solution through the slots is determined by slot dimensions (particularly width) and slot number, and the flow gradient is determined by slot orientation relative to de-inking solution flow. These characteristics will vary from application to application to meet the needs of a particular process. It is preferred, however, that, in order to prevent clogging of the slots while permitting uniform fluid flow through the flights 130, they 1) be elongated rather than being circular or being formed from small perforations as in a screen, 2) be straight rather than arcuate, and 3) extend away from the direction of screw rotation to inhibit clogging. "Away" as used herein means that the leading edge of each slot extends at an angle with respect to direction of conveyance. Radial slots thus extend perpendicularly from the direction of the conveyance and are the least prone to clogging.

In the embodiment illustrated in FIGS. 2–7, the slots 190 are designed to provide uniform flow of de-inking solution and extracted materials including ink (collectively known as an "effluent") through the flights 130 while assuredly avoiding clogging. To this end, the slots 190 extend radially along the flights 130, are of a constant width, and are distributed evenly around the circumference of the flights 130. The illustrated slot configuration is formed from patterns of a relatively long slot extending only part-way to the inner radial end of the flight section flanked by collinear shorter slots the inner one of which terminates proximate the inner radial end of the flight section 184 and the outer one of which terminates proximate the outer radial end of the flight section 184. This configuration has been found to provide the most uniform extraction possible. The illustrated configuration is also well suited for the extraction of materials from paper pulp having a consistent particle size with a relatively small percentage of fines so as to permit a generally uniform flow rate through the entire cross section of the pulp.

The extraction characteristics can also be set by setting the pitch of the screw conveyor 130. That is, the pitch of the screw determines the functional surface area of the pulp subject to extraction. A screw with a relatively high pitch presents a relatively high number of flights and accordingly subjects greater surface areas of products to extraction media flow. As a rule, the required functional surface area increases with the particle size gradient. Thus, a pulp having significant percentages of both small, dense particles and large, light-weight particles should be treated with a screw conveyor having a relatively high pitch, whereas a pulp exhibiting relatively uniform particle size and density should be treated in a screw conveyor having a relatively low pitch.

b. Operation

In use, newsprint pulp 194 (FIG. 4), received from the reactor 20 of FIG. 1, is fed into product inlet 144 at the back end 138 of housing 122 and conveyed upwardly through the housing at a rate of 20,000 pph as the screw conveyor 136 is driven by drive system 134 at a relatively slow rate of, e.g., 1–5 rpm. A de-inking solution, preferably comprising water which may if necessary contain other solvents, is simultaneously fed into de-inking solution inlets 152, 358, and 360 at a combined rate of 50,000 pph. Only the solution fed into inlet 152 uses water drawn from an external source, the remaining water being recycled from evaporator 60 as detailed below.

After being fed into the housing 122, the de-inking solution flows by gravity through the pulp 194 and through successive portions of the slots 190 in the flights 130 as illustrated in FIG. 4, thus dissolving the ink in the pulp and washing it from the pulp to form an effluent 192. The effluent 192 then drains through a screen 196 located at the back end 138 of housing 122 and through outlet 148 and into pipe 350. The treated pulp 194 is discharged from product outlet 156 at the front end 140 of the housing 122 and removed by conveyor 158 either to a press or to secondary reactor 40.

Part of the effluent removed from the outlet 148 of extractor 120 is preferably recycled to conserve water. Thus, in the illustrated embodiment, the solution drained from outlet 148 by pipe 350 is treated by a filter 352 and evaporator 60 as described above. Solvents are then added to a portion of the water, and the resulting de-inking solution is pumped through a pipe 356, through valves 362 and 364 located in branch pipes 366 and 368, and into inlets 358 and 360 of the housing 122. The recycled solution inlets 358 and 360 should be located downstream of fresh solution inlet 152 so that the purest water always contacts relatively "clean" pulp portions (having relatively low ink concentrations) upon injection and so that the less pure recycled water contacts "dirtier" product portions (having relatively high ink concentrations) upon injection. Using progressively "cleaner" extraction media to treat progressively "cleaner" product portions provides the most efficient extraction and is the heart of any counterflow extraction process.

Because the slots 190 run counter—indeed perpendicular—to the direction of rotation of the screw 126, the slots 190 are not clogged by the pulp 194. Accordingly, it is not necessary to periodically reverse the direction of the screw to unclog the slots 190. Pulp 194 may, depending upon its moisture content, tend to pile up on one side of the housing 122 as it is conveyed through the housing by the screw conveyor 126. Should this be the case, screw conveyor 126 can if necessary be periodically stopped to permit the pulp to fall by gravity back to the other side of the housing 122, thus assuring uniform extraction by preventing water from short circuiting along the other side of the housing 122.

c. Variations of Slot Configuration

As discussed above, a feature of the invention is that the configuration of slots in the flights can be varied to meet the needs of a particular application. Referring now to FIGS. 8–12, several such configurations will now be described with reference to flights 130A–130E, each of which is usable with the scroll 128 of the screw conveyor 126 of FIGS. 2–7.

Figure 8:
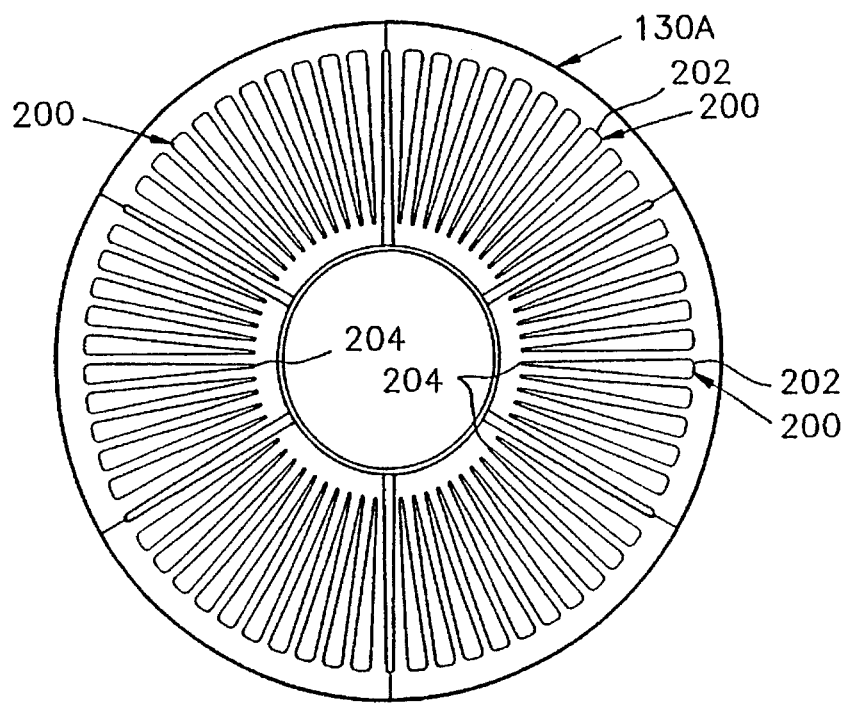
FIGS. 8–12 are end views of flights having other preferred slot configurations.

Referring to FIG. 8, flight 130A has a plurality of radial slots 200 which are spaced evenly around the circumference thereof and each of which is tapered from its outer radial end 202 to its inner radial end 204. This slot configuration is useful for the removal of fines from pulp having both large, low density particles and small, high density particles. The smaller, higher density particles tend to migrate towards the bottom or outer radial portion of the housing 122 while the larger particles migrate towards the shaft 132. The illustrated tapered slots permit the fines in the smaller particles to wash through the outer, wider portions of the slots 200. This configuration also subjects the remaining larger particles to more soaking.

Notwithstanding the previous discussion, it may be desirable in some instances to provide uniform soaking of all particles without washing a significant percentage of fines from the system. The flight 130B illustrated in FIG. 9 thus has slots 206 formed therein which taper outwardly from their outer radial ends 208 to their inner radial ends 210. The narrow outer slot portions inhibit fines from washing therethrough, and the wider inner slot portions permit the de-inking solution to flow through the larger particles at a higher rate, thus providing uniform washing.

Figure 9:
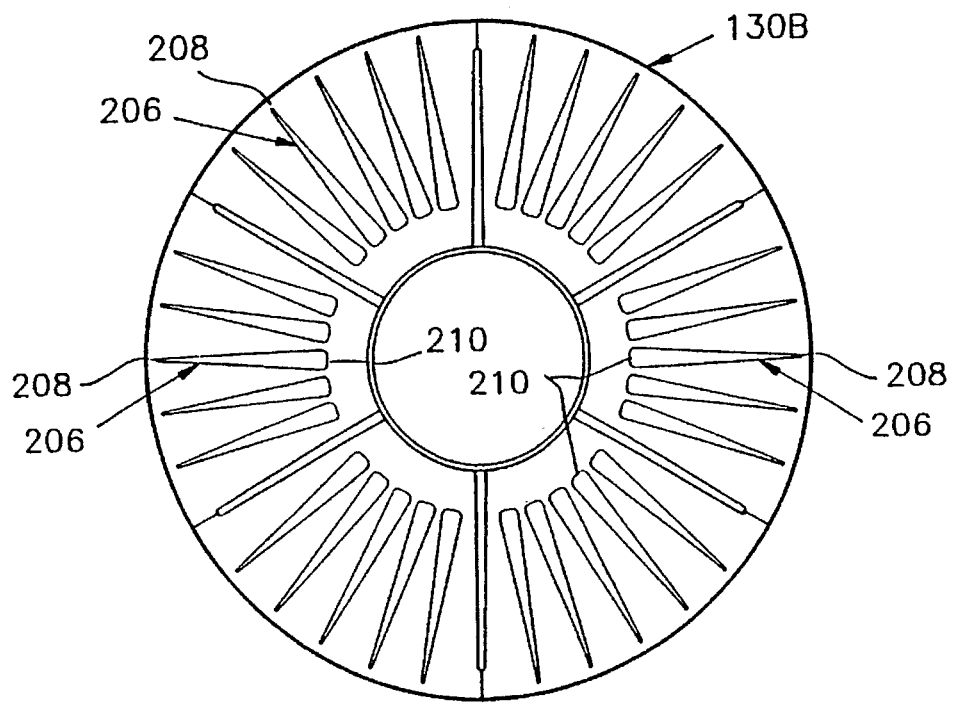
Figure 10:
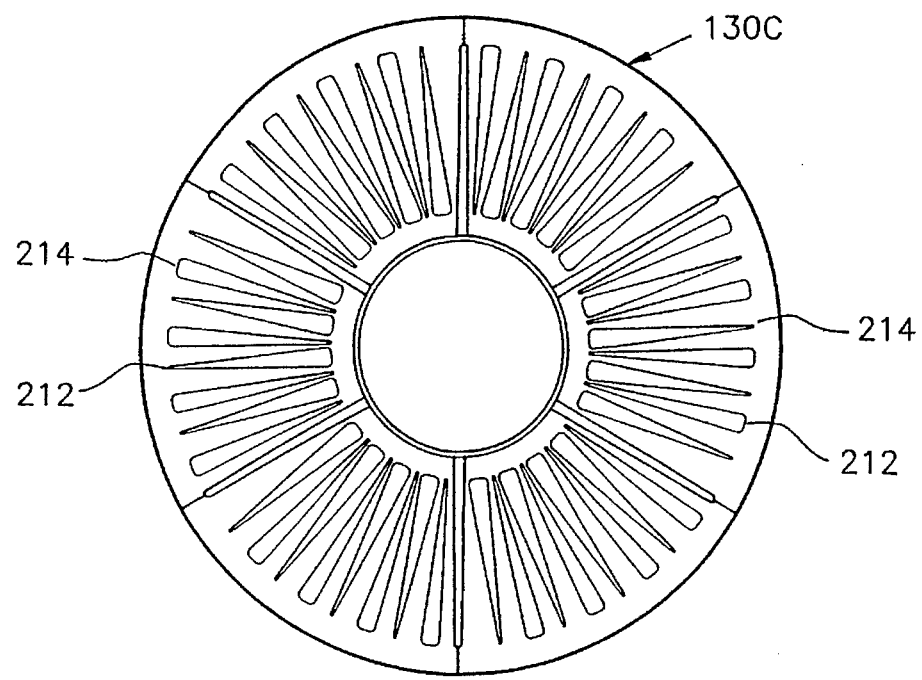

Maximum fines extraction could also be assured by combining the designs of FIGS. 8 and 9 to provide a slot configuration as illustrated in FIG. 10 in which the flight 130C is formed with a series of first and second alternating slots 212 and 214. The slots 212 taper inwardly from their outer ends to their inner ends, while the slots 214 taper outwardly from their outer ends to their inner ends. Light fines floating to the product surface wash through the inner portions of slots 214, and dense fines working to the outer portion of the product wash through the outer portions of slots 212.

It should be noted that it is not necessary that the slots extend radially. In fact, slots could extend at virtually any angle so long as they do not extend in the direction of screw rotation (although the danger of slot clogging increases as the angle of inclination approaches the direction of screw rotation). For instance, referring to FIG. 11, elongated slots 216 could be provided in a flight 130D which do not extend radially but which are angled counter to the direction of screw rotation as illustrated. This slot configuration would be used when the extractor is extracting materials from a relatively constant sized granular pulp product and would provided maximum wash through the granular product. In fact, the illustrated configuration provides the maximum extraction possible without actually using circular holes and without subjecting a high percentage of fines to washing through the slots.

Figure 11:
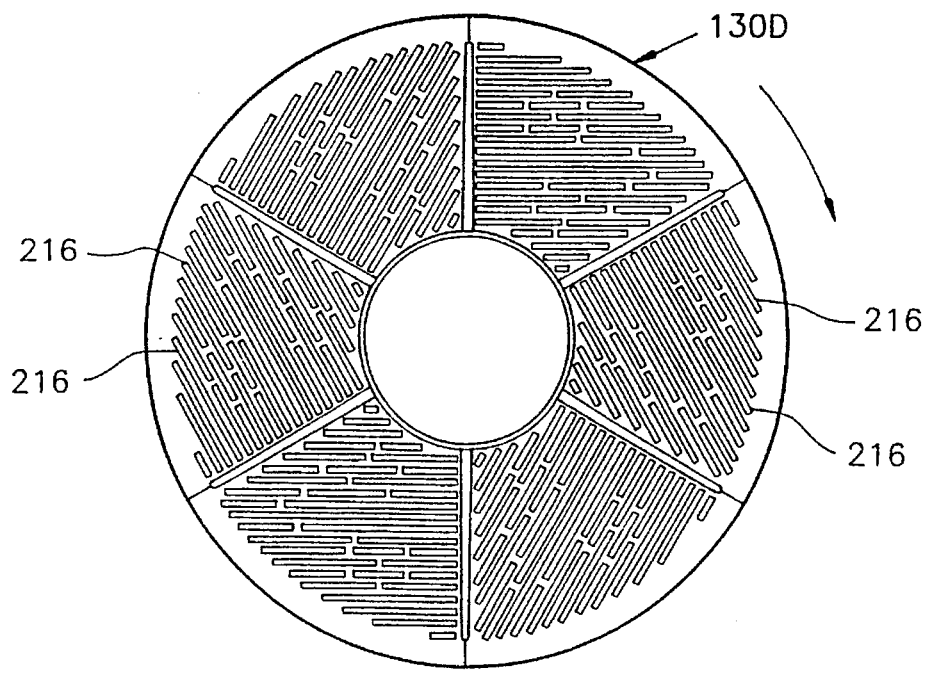
Figure 12:
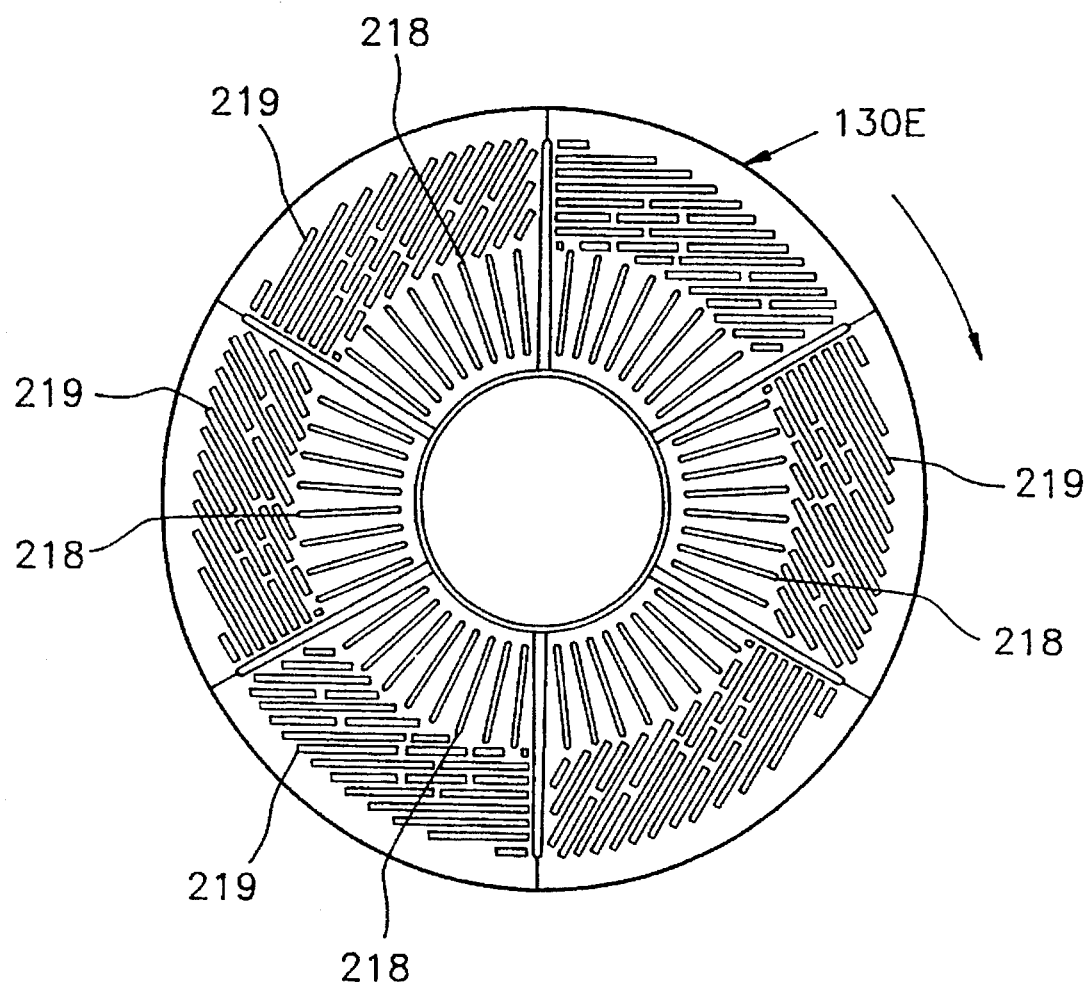

Finally, referring to FIG. 12, a combination of radial slots 218 and angled slots 219 could be employed in a flight 130E to combine the benefits of the configuration illustrated in FIG. 7 with that illustrated in FIG. 11.

Preferably, the flights of the primary extractor 120 present the slot configuration of FIG. 7 for uniform de-inking, and the flights of the secondary extractor 220 present the slot configuration of FIG. 11 for maximum extraction.

Many changes and modifications could be made without departing from the spirit and scope of the invention. For instance, fewer extractors may sometimes be required if the newsprint is easier to de-ink and/or if a lower quality end product is desired. Even where two separate extraction stages are preferred, e.g., to permit an operation such as bleaching between the two stages, the primary and secondary extractors could if desired be combined into a two-stage extractor in which the de-inking solution and possibly the pulp is removed at an intermediate portion of the extractor. One such extractor is disclosed and described in the co-pending patent application filed by David Ray Walker on an even date herewith and entitled "Method and Apparatus for Extracting Soluble and Dispersible Materials from Products Using a Slotted Scroll Extractor." Other changes and modification which could be made will become apparent from a reading of the appended claims.

I claim:

1. A method of de-inking newsprint pulp comprising:

A. feeding said pulp into an extractor including an inclined housing having lower and upper end portions, a pulp inlet and an effluent outlet being provided in said lower end portion and a de-inking solution inlet and a pulp outlet being provided in said upper end portion;

B. feeding a de-inking solution into said de-inking solution inlet;

C. conveying said pulp upwardly through said housing from said lower end portion to said upper end portion while said de-inking solution flows by gravity downwardly through said housing from said upper end portion towards said lower end portion in contact with successive portions of said pulp, thereby removing ink from said pulp and forming an effluent; and D. discharging said pulp from said pulp outlet and discharging said effluent from said effluent outlet, wherein
   1. a screw conveyor is mounted in said housing and includes a rotatable shaft and a plurality of flights, said shaft extending longitudinally of said housing, said flights (a) being mounted on said shaft, (b) extending generally transversely across said housing, (c) having an outer radial periphery remote from said shaft, and (d) having passages formed therethrough, said passages in each said flight being arranged such that they are spaced from said outer radial periphery of said flight; and wherein
   2. said step (C) comprises conveying said pulp upwardly through said housing with said flights while said de-inking solution flows downwardly through said pulp and through said passages in said flights, thereby washing said ink from said pulp and forming said effluent.

2. A method as defined in claim 1, wherein said de-inking solution comprises a water-based solvent solution, and further comprising
   A. feeding said effluent to an evaporator and separating at least some of water from said effluent to create an ink concentrate; and
   B. feeding at least a portion of the separated water to said de-inking solution inlet of said housing.

3. A method as defined in claim 2, further comprising feeding said ink concentrate to a floc tank and separating more of said water from said ink concentrate, thereby creating an ink sludge.

4. A method as defined in claim 1, wherein said extractor comprises a first extractor of a de-inking system, and further comprising the steps of
   A. feeding said pulp from said pulp outlet of said housing of said first extractor to a pulp inlet formed in a lower end portion of an inclined housing of a second extractor, said housing of said second extractor further including an upper end portion, wherein an effluent outlet is provided in said lower end portion of said housing of said second extractor, and wherein a de-inking solution inlet and a pulp outlet are provided in said upper end portion of said housing of said second extract;
   B. feeding a second de-inking solution into said de-inking solution inlet of said housing of said second extractor;
   C. conveying said pulp upwardly through said housing of said second extractor from said lower end portion of said second extractor to said upper end portion of said second extractor while said second de-inking solution flows downwardly through said housing of said second extractor from said upper end portion of said second extractor towards said lower end portion of said second extractor in contact with successive portions of said pulp, thereby removing ink from said pulp and forming a second effluent; and
   D. discharging said pulp from said pulp outlet of said housing of said second extractor and discharging said second effluent from said effluent outlet of said housing of said second extractor; wherein
      said step of conveying said pulp upwardly through said housing of said second extractor is performed by a second screw conveyor which is mounted in said housing of said second extractor and which includes a rotatable shaft and a plurality of flights, said shaft of said second screw conveyor extending longitudinally of said housing of said second extractor, each said flight of said second screw conveyor (a) being mounted on said shaft of said second screw conveyor, (b) extending generally transversely across said housing of said second extractor, (c) having an outer radial periphery remote from said shaft of said second screw conveyor, and (d) having passages formed therethrough, said passages in each said flight of said second screw conveyor being arranged such that they are spaced from said outer radial periphery of said flight of said second screw conveyor.

5. A method according to claim 4, further comprising bleaching said pulp after it is discharged from said first extractor and before it is fed to said second extractor.

6. A process as defined in claim 1, wherein said step D, comprises (1) discharging about 20,000 pph of said pulp from said pulp outlet and (2) discharging no more than about 50,000 pph of said effluent from said effluent outlet.

7. A method of de-inking newsprint pulp comprising:
   A. feeding said pulp into an extractor including a housing having first and second end portions, a pulp inlet and an effluent outlet being provided in said first end portion and a de-inking solution inlet and a pulp outlet being provided in said second end portion;
   B. feeding a de-inking solution into said de-inking solution inlet;
   C. conveying said pulp through said housing from said first end portion to said second end portion while said de-inking solution flows through said housing from said second end portion towards said first end portion, thereby removing ink from said pulp and forming an effluent; and
   D. discharging said pulp from said pulp outlet and discharging said effluent from said effluent outlet; wherein
      1. a screw conveyor is rotatably mounted in said housing, said screw conveyor including a rotatable shaft having generally transverse flights mounted thereon, said flights having passages formed therethrough, said passages comprising elongated slots extending in a direction counter to the direction of shaft rotation; and wherein
      2. said step (C) comprises conveying said pulp through said housing by rotating said shaft while said de-inking solution flows through said pulp and through said passages in said flights, thereby extracting said ink from said pulp and forming said effluent.

8. A method as defined in claim 7, further comprising periodically stopping screw rotation so as to permit pulp which is accumulated on one side of said housing to fall by gravity to the other side of the housing.

9. A method as defined in claim 7, further comprising heating the interior of said housing by conveying heated water through a chamber formed between said housing and an insulated jacket surrounding at least a portion of said housing.

10. A process of de-inking newsprint, comprising:
    A. feeding newsprint and warm water into a reactor;
    B. mixing said newsprint with said warm water in said reactor to form a pulp; then
    C. feeding said pulp and a de-inking solution into lower and upper inlets of an inclined extractor, respectively, said extractor including a housing and a screw conveyor which is mounted in said housing and which includes a rotatable shaft and a plurality of flights, each of said flights (a) extending generally transversely across said housing, (b) being mounted on said shaft, (c) having an outer radial periphery remote from said shaft, and (d) having passages formed therethrough, said passages in each said flight being arranged such that they are spaced from said outer radial periphery of said flight; then D. conveying said pulp upwardly through said extractor while said de-inking solution flows downwardly by gravity through successive portions of said pulp and through said passages in said flights, thereby washing ink from said pulp and forming an effluent; then E. discharging said effluent and said pulp from respective lower and upper outlets of said extractor;

F. feeding said effluent to an evaporator and evaporating water from said effluent to obtain relatively pure water; and then G. feeding said relatively pure water to said reactor and to said extractor.

11. A system for removing ink from ink-bearing newsprint pulp, said system comprising:

A. a source of said pulp; and

B. an extractor for de-inking said pulp, said extractor including
 1. an inclined housing having located therein a lower pulp inlet communicating with said source of newsprint pulp, an upper de-inking solution inlet, a lower effluent outlet, and an upper pulp outlet, and
 2. a screw conveyor rotatably mounted in said housing, said screw conveyor including
  a. a rotatable shaft, and
  b. a plurality of flights mounted generally transversely on said shaft and each having an outer radial periphery remote from said shaft, each of said flights having passages formed therethrough for the passage of liquids, said passages in each said flight being arranged such that they are spaced from said outer radial periphery of said flight, whereby, in use, de-inking solution, admitted to said housing via said de-inking solution inlet, flows by gravity through successive portions of pulp and through said passages in said flights, thereby washing ink from said pulp and forming an effluent.

12. A system as defined in claim 11, further comprising an insulated jacket surrounding at least a portion of said housing and defining a chamber, wherein said chamber is connected to a means for supplying heated water such that said chamber provides passage of the heated water.

13. A system as defined in claim 11, wherein said extractor comprises a first extractor, and further comprising a second extractor including
 1. a housing, said housing of said second extractor having formed therein 1) a pulp inlet communicating with said pulp outlet of said housing of said first extractor, 2) a de-inking solution inlet, 3) a pulp outlet, and 4) an effluent outlet, and
 2. a second screw conveyor rotatably mounted in said housing of said second extractor, said second screw conveyor including
  a. a rotatable shaft mounted in said housing of said second extractor, and
  b. a plurality of flights mounted generally transversely on said shaft of said second screw conveyor, each of said flights of said second screw conveyor having passages formed therethrough for the passage of liquids.

14. A system as defined in claim 13, further comprising a reactor provided between said first and second extractors, said reactor having 1) a bleach inlet, 2) a pulp inlet connected to said pulp outlet of said housing of said first extractor, and 3) a pulp outlet connected to said pulp inlet of said housing of said second extractor.

15. A system as defined in claim 11, further comprising an evaporator including

A. an inlet connected to said effluent outlet of said housing,

B. a pure water outlet connected to said de-inking solution outlet of said housing, and C. a concentrate inlet.

16. A system for removing ink from ink-bearing newsprint pulp, said system comprising:

A. a source of said pulp; and

B. an extractor for de-inking said pulp, said extractor including
 1. a housing having located therein a pulp inlet communicating with said source of said pulp, a de-inking solution inlet, an effluent outlet, and a pulp outlet, and
 2. a screw conveyor rotatably mounted in said housing, said screw conveyor including
  a. a rotatable shaft, and
  b. a plurality of flights mounted generally transversely on said shaft, each of said flights having passages formed therethrough for the passage of liquids, wherein said passages comprise elongated slots extending in a direction counter to the direction of shaft rotation.

17. A system as defined in claim 16, wherein said slots extend radially.

18. A method of de-inking newsprint pulp comprising:

A. feeding said pulp into an extractor including an inclined housing having lower and upper end portions, a pulp inlet and an effluent outlet being provided in said lower end portion and a de-inking solution inlet and a pulp outlet being provided in said upper end portion;

B. feeding a de-inking solution into said de-inking solution inlet;

C. conveying said pulp upwardly through said housing from said lower end portion to said upper end portion while said de-inking solution flows by gravity downwardly through said housing from said upper end portion towards said lower end portion in contact with successive portions of said pulp, thereby removing ink from said pulp and forming an effluent; and D. discharging said pulp from said pulp outlet and discharging said effluent from said effluent outlet, wherein
 1. a screw conveyor is mounted in said housing and includes rotatable shaft and a plurality of flights, said shaft extending longitudinally of said housing, said flights (a) being mounted on said shaft, (b) extending generally transversely across said housing, and (c) having passages formed therethrough, wherein
 2. during said step (C), an entire periphery of said of said flights sealingly engages a sidewall of said housing to prevent fluid flow between said flights and said sidewall of said housing; and wherein
 3. said step (C) comprises conveying said pulp upwardly through said housing with said flights while said de-linking solution flows downwardly through said pulp and through said passages in said flights, thereby washing said ink from said pulp and forming said effluent.

19. A system for removing ink from ink-bearing newsprint pulp, said system comprising:

A. a source of said pulp; and

B. an extractor for de-inking said pulp, said extractor including 1. an inclined housing having located therein a lower pulp inlet communicating with said source of said pulp, an upper de-inking solution inlet, a lower effluent outlet, and an upper pulp outlet, and 2. a screw conveyor rotatably mounted in said housing, said screw conveyor including a. a rotatable shaft, and b. a plurality of flights mounted generally transversely on said shaft, each of said flights having passages formed therethrough for the passage of liquids, wherein an entire periphery of each of said flights sealingly engages a sidewall of said housing to prevent fluid flow between said flights and said sidewall of said housing, whereby, in use, de-inking solution, admitted to said housing via said de-inking solution inlet, flows by gravity through successive portions of pulp and through said passages in said flights, thereby washing ink from said pulp and forming an effluent.

* * * * *